US011015921B2

(12) United States Patent
Shimoyama et al.

(10) Patent No.: US 11,015,921 B2
(45) Date of Patent: May 25, 2021

(54) MEASUREMENT SYSTEM

(71) Applicant: HONDA MOTOR CO., LTD., Tokyo (JP)

(72) Inventors: Masao Shimoyama, Tochigi (JP); Shinji Yonehana, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/737,286

(22) Filed: Jan. 8, 2020

(65) Prior Publication Data

US 2020/0225025 A1    Jul. 16, 2020

(30) Foreign Application Priority Data

Jan. 11, 2019    (JP) .............................. JP2019-003057

(51) Int. Cl.
*G01B 11/24* (2006.01)
*H04N 5/225* (2006.01)
*H04N 7/18* (2006.01)

(52) U.S. Cl.
CPC .......... *G01B 11/24* (2013.01); *H04N 5/2253* (2013.01); *H04N 7/18* (2013.01)

(58) Field of Classification Search
None
See application file for complete search history.

(56) References Cited

U.S. PATENT DOCUMENTS

| | | | | |
|---|---|---|---|---|
| 6,353,461 B1* | 3/2002 | Shore | ................... | G11B 27/034 348/239 |
| 6,781,703 B1* | 8/2004 | Southwood | ............ | G01B 11/08 250/559.23 |
| 2013/0125044 A1* | 5/2013 | Saylor | .................. | G05B 19/409 715/785 |
| 2014/0018955 A1* | 1/2014 | Asakawa | ......... | G05B 19/41865 700/230 |
| 2020/0035022 A1* | 1/2020 | Huang | ................... | G01B 11/24 |

FOREIGN PATENT DOCUMENTS

| | | |
|---|---|---|
| JP | H04-346006 | 12/1992 |
| JP | H05-046630 A | 2/1993 |

* cited by examiner

*Primary Examiner* — Frederick D Bailey
(74) *Attorney, Agent, or Firm* — Rankin, Hill & Clark LLP

(57) ABSTRACT

A measurement system includes: a measurement device configured to acquire a measurement data of a workpiece, a display configured to display a workpiece information corresponding to the workpiece, a reader configured to read the workpiece information displayed by the display; and a controller having a memory configured to store the workpiece information read by the reader and the measurement data of the workpiece acquired by the measurement device associated with each other.

6 Claims, 5 Drawing Sheets

| MODEL : 001 | TASK CODE : A - 1 | | FIXED ID NUMBER : abcde11102 |
|---|---|---|---|
| PLANNED NUMBER : 30 | ACTUAL NUMBER : 15 | REMAINING NUMBER : 15 | PRECEDING ID NUMBER : abcde11101 |

| NO. | DATE - LOT | MODEL | TASK CODE | PLANNED NUMBER |
|---|---|---|---|---|
| 1 | 1101 - 01 | 001 | A - 1 | 30 |
| 2 | 1101 - 02 | 101 | A - 2 | 5 |
| 3 | 1101 - 03 | 141 | B - 1 | 47 |
| 4 | 1101 - 04 | 151 | B - 2 | 21 |

FIG. 4

| SEQ | MODEL | FIXED ID NUMBER | MEASUREMENT VALUE | ESTIMATED AVAILABLE CAPACITY | REMAINING NUMBER |
|---|---|---|---|---|---|
| 1 | 001 | abcde11101 | +0.001 | 99% | 16 |
| 2 | 001 | abcde11102 | -0.001 | 98% | 15 |
| 3 | 001 | abcde11103 | 0.000 | 97% | 14 |
| ⋮ | ⋮ | ⋮ | ⋮ | ⋮ | ⋮ |
| 17 | 001 | abcde11117 | 0.000 | 70% | 0 |
| 18 | 101 | fghij22201 | -0.002 | 69% | 4 |
| 19 | 101 | fghij22202 | -0.001 | 68% | 3 |

MEASUREMENT SYSTEM

CROSS-REFERENCE TO RELATED APPLICATION

This application is based upon and claims the benefit of priority from Japanese Patent Application No. 2019-003057 filed on Jan. 11, 2019, the content of which is incorporated herein by reference.

BACKGROUND OF THE INVENTION

Field of the Invention

This invention relates to a measurement system for measuring shapes or the like of workpieces.

Description of the Related Art

There have been known devices that collect shape data or the like by measuring shapes or the like of products flowing on the production line. Such a device is described in, for example, Japanese Unexamined Patent Application Publication No. H04-346006 (JPH04-346006A). The device described in JPH04-346006A captures an image of a product using a CCD camera to acquire data indicating the amount of displacement from the reference position of the product, reads product type information previously attached to the product using a bar code reader, and manages the acquired data indicating the amount of displacement in such a manner that the data is associated with the product type information.

However, devices that read product identification information previously attached to a product, such as JPH04-346006A, may have difficulty in reading the product identification information, since the display position of the product identification information may vary depending on the size, shape, or the like of the product.

SUMMARY OF THE INVENTION

An aspect of the present invention is a measurement system including: a measurement device configured to acquire a measurement data of a workpiece, a display configured to display a workpiece information corresponding to the workpiece, a reader configured to read the workpiece information displayed by the display; and a controller having a memory configured to store the workpiece information read by the reader in association with the measurement data of the workpiece acquired by the measurement device.

BRIEF DESCRIPTION OF THE DRAWINGS

The objects, features, and advantages of the present invention will become clearer from the following description of embodiments in relation to the attached drawings, in which:

FIG. 4 is a diagram showing an example of the display screen displayed on the monitor of the measurement controller of FIG. 1;

DETAILED DESCRIPTION OF THE INVENTION

Hereinafter, an embodiment of the present invention will be described with reference to FIGS. 1 to 6. A measurement system according to the embodiment of the present invention is a system for evaluating tasks in a product production process and performs a measurement step of measuring shapes or the like of workpieces. While this measurement system can be applied to the production processes of various types of products, application thereof to a measurement step of an automobile production process will be described as an example.

Figures 1, 2:
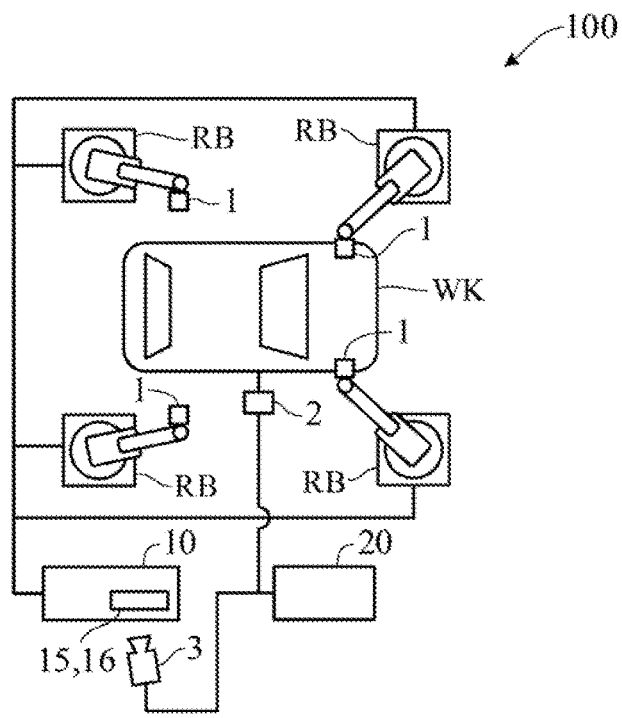
FIG. 1 is a diagram schematically showing overall configuration of a measurement system according to an embodiment of the present invention.
FIG. 2 is a diagram showing an example of a display screen of a monitor of a facility controller of FIG. 1.

FIG. 1 is a drawing schematically showing an overall configuration of a measurement system 100 according to the embodiment of the present invention. An automobile production process includes multiple steps, including a pressing step of forming workpieces, such as a body frame, from a steel sheet, a welding step of welding the workpieces together, a coating step of coating the workpieces with paint, and an assembly step of assembling the workpieces.

Each production step includes multiple tasks. For example, the assembly step includes a task of mounting an engine, tires, and the like on a body frame. FIG. 1 shows an example of a step corresponding to one of these steps (e.g., the welding step).

In the production step shown in FIG. 1, a product (workpiece) WK is automatically produced using robots RB. In the example in FIG. 1, the workpiece WK (e.g., a body frame) is being welded using four robots RB. Each robot RB includes an arm, a hand on the end of the arm, and the like, and these components are driven by actuators, such as servo motors.

In FIG. 1, a welder 1 is mounted on each arm end as a part of the actuator. The actuators for driving the robots RB are driven in accordance with an instruction from a facility controller 10 including a programmable logic controller (PLC), a servo amplifier, and the like. Thus, the operation of the robots RB is controlled.

In an automobile production process, various types of workpieces according to various specifications (models) are produced. Accordingly, the details of the tasks in each production step vary among models. In the example in FIG. 1, the shape and welding positions of the workpiece WK vary among models. Therefore, the set values of the facility controller 10 for controlling the operation of the robots RB also vary among models. For example, the set values are automatically changed in accordance with a preset production plan.

The facility controller 10 is provided with an input unit 15, such as a keyboard or touchscreen, and a monitor 16. A worker (or a manager) in charge of each production step is able to grasp the details of a task that the robots RB are currently performing, by checking various types of information displayed on the monitor 16. When necessary, the worker is able to change the set values or issue an instruction for an urgent stop of the robots RB or other purposes, through the input unit 15.

The measurement system 100 includes a measurement device 2 that is disposed so as to face the measurement position of a workpiece WK and measures the shape or the like of the workpiece WK. The measurement device 2 is configured as, for example, a laser distance meter, camera, or the like and measures the shape or the like of a workpiece WK that has undergone the tasks in each production step. Thus, the accuracy of machining, such as welding or assembly, is evaluated. For example, the measurement device 2 measures the difference (distance) between the reference position of the workpiece WK and the actual position of the machined workpiece WK, or the like.

The measurement device 2 includes a measuring unit that includes, for example, a laser emitter, a light receiver, and the like and an adjuster that adjusts the position and measurement direction of the measuring unit. These components are driven by an actuator. A measurement controller 20 is connected to the measurement device 2. The actuator for driving the measurement device 2 is driven in accordance with an instruction from the measurement controller 20. Thus, the operation of the measurement device 2 is controlled. The measurement controller 20 manages the measurement data obtained by the measurement device 2 in such a manner that the measurement data is associated with workpiece information, such as identification information, of the workpiece WK.

FIG. 2 is a diagram showing an example of a display screen of the monitor 16 of the facility controller 10. As shown in FIG. 2, the monitor 16 displays identification information 161 of the current workpiece (e.g., a body frame) WK, identification information 162 of the previous workpiece WK, model information 163 of the current workpiece WK, task code information 164 indicating the details of a task, planned number information 165 indicating the number of workpieces that are planned to be worked on, actual number information 166 indicating the number of workpieces that have been worked on so far, remaining number information 167 indicating the remaining number of the current model of workpieces, and production plan information 168.

As shown in FIG. 2, as the production plan information 168, a part of production plan information, such as the model, task code, and planned number, is displayed for each planned production date and production lot number in a tabular form. As the production plan information 168, among the overall production plan information, the production plan information of the current production lot and the subsequent some production lots (in the example in FIG. 2, three lots) is displayed. The production plan information relating to the current production lot is highlighted. The display of the production plan information 168 is changed in such a manner that when the current production lot is changed, the other production lots are also sequentially changed.

As seen above, it is necessary to associate the measurement data of the workpiece WK with workpiece information specific to the workpiece WK. To do so, the following configuration is conceivable: a bar code or the like representing workpiece information is previously attached to each workpiece WK; the measurement device 2 obtains the workpiece information during measurement by reading the bar code using a bar code reader or the like; and the obtained workpiece information is associated with the measurement data of the workpiece WK.

In the case of this configuration, however, the display position of the workpiece information may vary depending on the size, shape, or the like of the workpiece WK, making it difficult to read the workpiece information. For this reason, in the present embodiment, the measurement system 100 is configured as follows so that the measurement data and workpiece information of the workpiece WK can be managed in an associated manner regardless of the size, shape, or the like of the workpiece WK.

Figure 3:
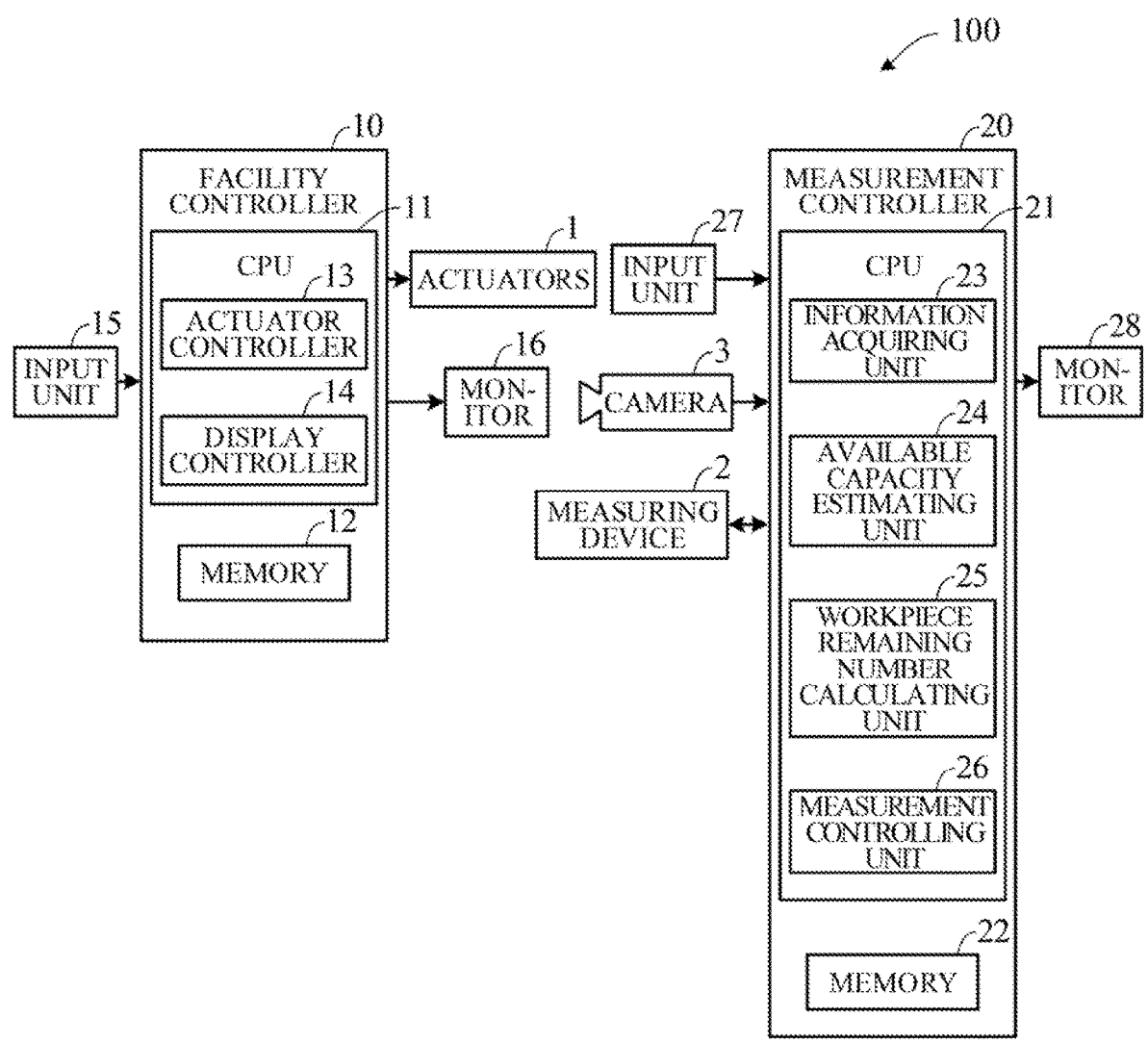
FIG. 3 is a block diagram showing configuration of major components of the measurement system according to the embodiment of the present invention.

FIG. 3 is a block diagram showing the configuration of major components of the measurement system 100 according to the embodiment of the present invention and mainly shows the configuration of the facility controller 10 and measurement controller 20. As shown in FIG. 3, with regard to the facility controller 10, the input unit 15, the monitor 16, and the actuators (welders 1) of the robots RB are connected thereto.

The facility controller 10 is a dedicated device for controlling the operation of the robots RB and is formed so as to be disconnected from an external network, such as the Internet. That is, the facility controller 10 is formed as a device that is not exposed to network threats, such as intrusion of a computer virus, that is, has high security.

The facility controller 10 includes an arithmetic processing unit including a CPU 11, a memory 12, such as a ROM or RAM and other peripheral circuits, such as an I/O interface, and the like. The CPU 11 serves as an actuator controller 13 that generates control signals for controlling the operation of the robots RB and outputs them to the actuators and a display controller 14 that generates image signals and outputs them to the monitor 16.

As for the measurement controller 20, an input unit 27, a monitor 28, the measurement device 2, and a camera 3 are connected thereto. The camera 3 is disposed in such a manner that it can photograph or capture an image of the entire display screen of the monitor 16 while preventing the worker in charge of each production step, who is seeing the monitor 16, from entering the photographing range. For example, the camera 3 is disposed in a fixed manner in a position that faces the monitor 16 of the facility controller 10 and in which the camera 3 can capture an image of the monitor 16 obliquely from above. The camera 3 captures moving images of the display screen of the monitor 16. Note that the camera 3 may capture a still image every predetermined time.

The measurement controller 20 is configured as, for example, a general-purpose computer such as a commercially available laptop computer. The measurement controller 20 is connected to an external network as necessary for an update of the operating system or other purposes.

The measurement controller 20 includes an arithmetic processing unit including a CPU 21, a memory 22, such as a ROM or RAM, other peripheral circuits, such as an I/O interface, and the like. The CPU 21 serves as an information acquiring unit 23 that acquires the measurement data acquired by the measurement device 2 and the image data acquired by the camera 3, an available capacity estimating unit 24 that estimates the available capacity of the memory 22, a workpiece remaining number calculating unit 25 that calculates the remaining number of the current model of workpieces, and a measurement controlling unit 26 that generates control signals for controlling the operation of the measurement device 2 and outputs them.

The information acquiring unit 23 acquires character information by performing character recognition processing, such as optical character recognition (OCR), on the image data of the display screen (FIG. 2) of the monitor 16 of the facility controller 10 captured by the camera 3. Thus, the information acquiring unit 23 is able to acquire workpiece information, such as the identification information 161, of the current workpiece WK. The measurement data of the workpiece WK acquired by the measurement device 2 is stored in the memory 22 so as to be associated with the workpiece information acquired by the information acquiring unit 23.

To perform character recognition processing on image data, the image data is required to have a resolution necessary to recognize characters. In this regard, in the present embodiment, the camera 3 captures an image of the display screen of the fixed monitor 16 disposed on the facility controller 10 (FIG. 1). For this reason, the imaging distance from the camera 3 to the monitor 16 is constant, and it is possible to easily capture an image of a display screen as shown in FIG. 2 without using a high-resolution camera.

The camera 3 acquires character information from the display screen of the monitor 16 of the facility controller 10 that the worker in charge of each production step sees to check necessary information. This eliminates the need to separately provide any other object to be captured by the camera 3, allowing for simplification of the overall configuration of the measurement system 100.

On the other hand, for example, in another configuration in which the camera 3 has to read workpiece information such as a bar code attached to a workpiece WK, the distance from the camera 3 to the displaying position of the workpiece information (e.g., bar code surface) varies depending on the shape or the like of the workpiece WK. Consequently, a high-resolution camera needs to be used, resulting in an increase in the overall cost of the measurement system 100. Also, it is difficult to accurately acquire character information.

In the present embodiment, the facility controller 10 that controls the operation of the production facilities, such as the robots RB, is used only in the production plant and is disconnected from an external network. On the other hand, the measurement controller 20 that controls the operation of the measurement device 2 that measures the shape or the like of a workpiece WK is configured as a general-purpose computer and is connected to an external network as necessary for updating the operation system or other purposes. Thus, the facility controller 10 and measurement controller 20 are electrically disconnected from each other.

The camera 3 optically reads the workpiece information from the display screen of the monitor 16 of the facility controller 10. Therefore, the facility controller 10 can be reliably protected from a network threat, such as intrusion of a computer virus. In other words, since the character information is acquired using the camera 3 rather than using electrical communication, it becomes possible to eliminate electrical communication between the facility controller 10 and the measurement controller 20, thereby reliably disconnecting the facility controller 10 from the external network.

FIG. 4 is a diagram showing an example of the display screen of the monitor 28 of the measurement controller 20, and the similar information as shown in FIG. 4 is stored in the memory 22. That is, the measurement data (measurement value) acquired by the measurement device 2 is stored in the memory 22 so as to be associated with the workpiece information (fixed identification number), as well as displayed on the monitor 28 in accordance with an instruction of the user (the worker in charge of each production step) inputted through the input unit 27.

As shown in FIG. 4, a part of measurement data is displayed for the respective fixed identification numbers of workpieces WK corresponding to the workpiece information on the monitor 28 of the measurement controller 20. Also, various types of information, such as the estimated available capacity of the memory 22 in which the measurement data has been stored and the remaining number of the current model of workpieces WK that have yet to be measured, are displayed on the monitor 28.

As seen above, the measurement data of the workpieces WK measured by the measurement device 2 after each production step is performed using the robots RB is managed and accumulated so as to be associated with the workpiece information corresponding to the workpieces WK. Thus, the measurement data can be used for an improvement in each production step or other purposes. In particular, the measurement data managed so as to be associated with the workpiece information, such as the models and the details of the tasks in each production step, can be usefully utilized for design of a new model or production facility or other purposes.

The available capacity estimating unit 24 of the measurement controller 20 estimates the available capacity of the memory 22 on the basis of workpiece information, such as the identification information 161, of the current workpiece WK acquired by the information acquiring unit 23. For example, the available capacity estimating unit 24 estimates the current available capacity of the memory 22 each time a new workpiece WK is measured, on the basis of the memory usage of measurement data of one workpiece WK preset in accordance with details of measurements made by the measurement device 2.

If the estimated available capacity is equal to or smaller than a preset threshold (e.g., 10%), the available capacity estimating unit 24 notifies the user, for example, by displaying an alarm message on the monitor 28 of the measurement controller 20. Instead of notifying the user, the available capacity estimating unit 24 may, for example, automatically transfer the measurement data to a server or the like through the network. Thus, a failure to store the measurement data can be prevented.

The workpiece remaining number calculating unit 25 calculates the remaining number of the current model of workpieces WK on the basis of the workpiece information such as the identification information 161 of the current workpiece WK and the production plan information 168 acquired by the information acquiring unit 23. Note that if the remaining number information 167 is displayed on the monitor 16 of the facility controller 10 as shown in FIG. 2, the remaining number information 167 acquired through the camera 3 may be used as the remaining number of workpieces WK.

The measurement controlling unit 26 controls the operation (position or the like) of the measurement device 2 on the basis of the workpiece information, such as the task code information 164 indicating the details of a task for the current model and the production plan information 168, acquired by the information acquiring unit 23. Specifically, the measurement controlling unit 26 controls the operation of the measurement device 2 by outputting control signals to the actuator of the measurement device 2 so that the measurement conditions, such as the measurement position, when measuring the shape or the like of a workpiece WK are changed in accordance with the details of the tasks for each model.

Also, when the remaining number of the current model of workpieces WK calculated by the workpiece remaining number calculating unit 25 reaches a present number (e.g., 0), the measurement controlling unit 26 controls the operation of the measurement device 2 to change the measurement conditions in accordance with the details of the tasks for the subsequent model. That is, the measurement controlling unit 26 controls the operation of the measurement device 2 so as to change the measurement conditions, such as the measurement position, after measurement of the current model of workpieces WK is completed and before measurement of the subsequent model of workpieces WK is started.

Note that if changing the model to be produced requires a preparation time, for example, a time required to replace the measurement device 2, preparation may be started, for example, during measurement of a workpiece preceding the last workpiece WK of the current model by several workpieces. That is, the operation of the measurement device 2 may be controlled earlier.

Figure 5:
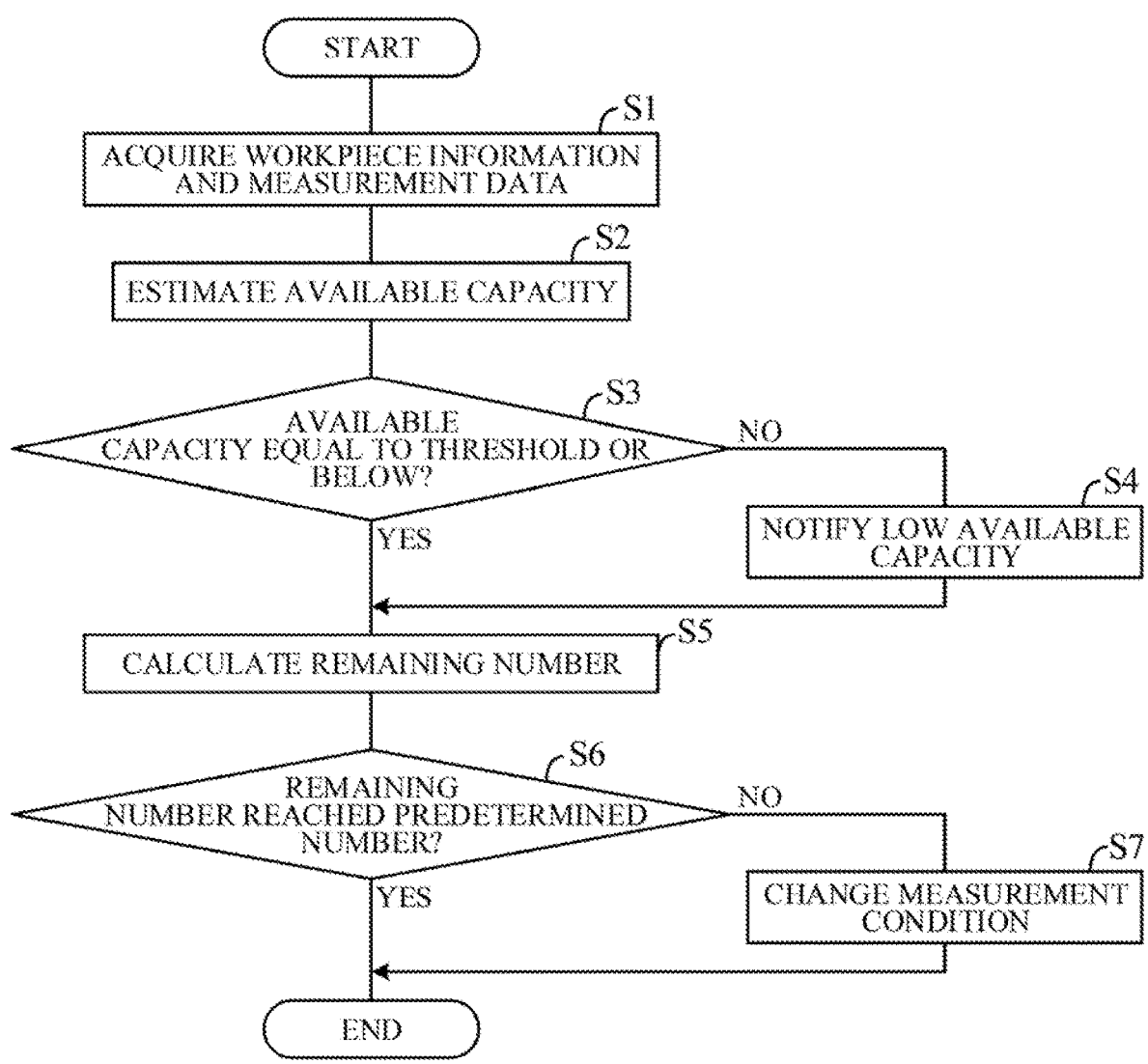
FIG. 5 is a flowchart showing an example of a process performed by the measurement controller of FIG. 1.

FIG. 5 is a flowchart showing an example of a process performed by the measurement controller 20 in accordance with a program previously stored in the memory. The process shown in this flowchart is performed each time the measurement controller 20 receives new measurement data from the measurement device 2. That is, this process is performed each time each workpiece WK undergoes each production step and measurement step and measurement data is outputted from the measurement device 2.

First, in S1 (S means a process step), the information acquiring unit 23 acquires measurement data from the measurement device 2 and workpiece information from the camera 3. Then, in S2, the available capacity estimating unit 24 estimates the available capacity of the memory 22 of the measurement controller 20 on the basis of the workpiece information, such as the identification information 161, of the current workpiece WK acquired in S1.

Then, in S3, it is determined whether the available capacity estimated in S2 is equal to or smaller than a threshold. If the determination in S3 is YES, the process proceeds to S4 to output a notification signal for alarming that the available capacity is lowered. Then, the process proceeds to S5. If the determination in S3 is NO, the process proceeds to S5.

In S5, the workpiece remaining number calculating unit 25 calculates the remaining number of the current model of workpieces WK that are planned to be produced, on the basis of the workpiece information, such as the identification information 161, of the current workpiece WK and the production plan information 168 acquired in S1.

Then, in S6, it is determined whether the remaining number of the current model of workpieces WK calculated in S5 has reached the predetermined number. If the determination in S6 is YES, the measurement controlling unit 26, in S7, controls the operation of the measurement device 2 so as to change the measurement conditions in accordance with the details of the tasks for the subsequent model. If the determination in S6 is NO, the process ends.

The above-mentioned operation of the measurement system 100 is summarized as follows. When the measurement device 2 is measuring a workpiece WK, the measurement controller 20 optically reads workpiece information corresponding to the workpiece WK from the display screen of the monitor 16 using the camera 3. That is, the measurement controller 20 acquires the measurement data in such a manner that the measurement data is associated with the workpiece information (S1). Thus, the measurement data and workpiece information of the workpiece WK can be managed in an accurately associated manner regardless of the size, shape, or the like of the workpiece WK.

Since the camera 3 optically reads the workpiece information from the display screen of the monitor 16 of the facility controller 10, the facility controller 10 is allowed to be reliably disconnected from the external network. Thus, even if a computer virus intrudes into the measurement controller 20, the facility controller 10 is not affected by the computer virus.

When the available capacity of the memory 22 of the measurement controller 20 is lowered, an information alarming that the available capacity is lowered is notified to the worker in charge of that production step, or the like (S2 to S4). With this, a failure to store the measurement data from the measurement device 2 due to a shortage of the available memory capacity can be prevented. When the remaining number of the current model of workpieces WK reaches the predetermined number, preparation for the measurement of the subsequent model of workpieces WK is started, for example, by changing the measurement conditions in accordance with the details of the tasks for the subsequent model (S5 to S7). This allows the measurement device 2 to continue measurement without interrupting the task in the current production step and thus allows for an increase in production efficiency.

Figure 6:
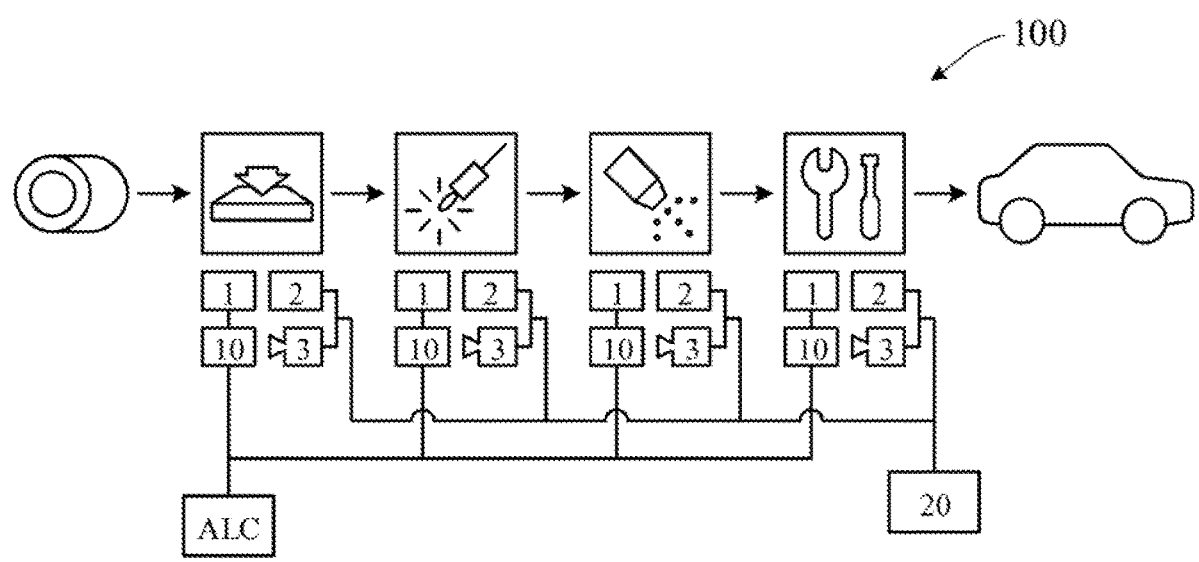
FIG. 6 is a schematic diagram showing a modification of the measurement system according to the embodiment of the present invention.

FIG. 6 is a schematic diagram showing a modification of the measurement system 100 according to the embodiment of the present invention. In an automobile production plant, multiple production steps, such as a pressing step, a welding step, a coating step, and an assembly step, and multiple tasks included in each production step are centrally controlled by an assembly line control (ALC) system. FIG. 6 shows an example of a measurement system 100 including such an ALC system.

As shown in FIG. 6, a facility controller 10 for each production step is connected to the ALC system. The facility controllers 10 control production facilities (the actuators of robots RB, and the like) in accordance with a production plan managed by the ALC system, as well as display various types of information required by the worker in charge of each production step, on monitors 16 (FIG. 1). Measurement devices 2 that measure the shape or the like of workpieces WK and cameras 3 that capture images of the monitors 16 are disposed so as to be associated with the respective production steps. The measurement devices 2 and cameras 3 are connected to a single measurement controller 20.

Signals outputted from each of the measurement devices 2 and cameras 3 disposed so as to be associated with each of the multiple production steps are read by the measurement controller 20 connected to these devices. Thus, the measurement data acquired by the measurement devices 2 and the workpiece information read by the cameras 3 in the respective production steps can be centrally managed. In this case, the workpieces WK are assigned identification information specific to each corresponding product, such as vehicle identification number (VIN), and the measurement data is managed and accumulated so as to be associated with the specific identification information.

The embodiment of the present invention can produce the following advantageous effects.

(1) The measurement system 100 includes the measurement device 2 that measures a workpiece WK and acquires measurement data of the workpiece WK, the monitor 16 of the facility controller 10 that displays workpiece information corresponding to the workpiece WK, the camera 3 that reads the workpiece information displayed on the monitor 16, and the measurement controller 20 having the memory 22 that stores the workpiece information read by the camera 3 and measurement data of the workpiece WK acquired by the measurement device 2 associated with each other (FIG. 1, FIG. 3).

With this, the memory 22 is able to store the measurement data and workpiece information of the same workpiece WK in a properly associated manner regardless of the shape or the like of the workpiece WK. Also, acquiring the workpiece information using the camera 3, that is, using a method other than electrical communication, allows for communicative disconnection between the facility controller 10 and measurement controller 20 and thus allows for reliable disconnection of the facility controller 10 from the external network. As a result, the entire control system in the production plant that controls the facility controller 10 can be reliably protected from a network threat.

(2) The workpiece WK is produced in accordance with a production plan. The workpiece information includes the identification information 161 of the workpiece WK and the production plan information 168. By acquiring the workpiece information including the identification information 161 of the workpiece WK and the production plan information 168, it is possible to grasp the timing at which the model to be produced in each production step is changed and the shape or the like of the workpiece WK is changed. Thus, preparation, such as change of the measurement conditions of the measurement device 2, can be made in a timely manner.

(3) The memory 22 has a predetermined storage capacity. The measurement controller 20 estimates the available capacity of the memory 22 on the basis of the production plan information 168 read by the camera 3 and outputs a notification signal for the user when the estimated available capacity is equal to or smaller than the predetermined value. Thus, a failure to store the measurement data due to a shortage of capacity of the memory 22 can be prevented.

(4) The measurement controller 20 also controls the operation of the measurement device 2 on the basis of the production plan information 168 read by the camera 3. Thus, when the model to be produced in each production step is changed and the shape or the like of the workpiece WK is changed, the measurement controller 20 is able to change the measurement conditions, such as the measurement position, of the measurement device 2 in a timely manner. This allows for smooth production of different models of workpieces WK while continuing measurement using the measurement device 2.

(5) The monitor 16 displays the workpiece information of the workpiece WK in such a manner that the worker in charge of each production step can check necessary information. The workpiece information displayed on the monitor 16 is read by the camera 3. This eliminates the need to separately provide a target whose image is captured by the camera 3, allowing for simplification of the entire configuration of the measurement system 100.

(6) The camera 3 is disposed such that it can capture an image of or photograph the entire display screen of the monitor 16 by preventing the worker in charge of each production step who checks the monitor 16 from entering the photographing range. For example, the camera 3 is disposed in a fixed manner in a position in which it can capture an image of the monitor 16 obliquely from above. For this reason, the imaging distance from the camera 3 to the monitor 16 is constant regardless of the size, shape, or the like of the workpiece WK. This allows for easy capturing of an image of the display screen of the monitor 16 without having to use a high-resolution camera and allows for accurate acquisition of workpiece information.

The above-mentioned embodiment can be modified into various forms. Hereafter, modifications will be described. While, in the above embodiment, the example in which automobiles are produced using the measurement system 100 has been described, a measurement system of the present invention is not limited to the above configuration and can also be applied to any other cases in which other products are produced.

While, in the above embodiment, various types of information as shown in FIG. 2 are displayed on the monitor 16 as workpiece information corresponding to a workpiece, workpiece information is not limited to such information. For example, the workpiece information may include the control values of the facility controller when machining the workpiece, the environmental conditions, such as the temperature and humidity, in the production plant, the name of the worker in charge of each production step, and the like.

While, in the above embodiment, the facility controller 10 and the camera 3 that captures an image of the monitor 16 thereof are disposed in each production step, a display configured to display workpiece information corresponding to the workpiece and a reader or a camera configured to read workpiece information displayed on the display are not limited to those described above. For example, the monitor can be a monitor disposed on a facility controller that centrally controls operation of multiple production facilities, or can be a single multi-display monitor disposed so as to correspond to multiple facility controllers. If the monitor is configured as a multi-display, the number of cameras can be reduced to one.

While, in the above embodiment, the measurement device 2, such as a laser distance meter, measures the shape or the like of a workpiece WK in the welding step, a measurement device configured to acquire a measurement data of a workpiece is not limited to that described above. For example, the measurement device may be a CCD camera or the like that checks whether defects, such as wear and tear, are present on the coating surface of a workpiece in the coating step.

While, in the above embodiment, the memory 22 of the measurement controller 20 consisting of a general-purpose computer stores workpiece information and measurement data of a workpiece WK, a memory configured to store the workpiece information and the measurement data of the workpiece associated with each other is not limited to that described above. The memory can be provided separately from the controller. For example, an external memory connected to the controller or a storage area or the like on a server may be used as the memory. In this case, a device that reads various types of information from the memory is referred to as a controller.

While, in the above embodiment, the camera 3 captures an image of the display screen of the monitor 16, a reader can be of any type as long as it reads workpiece information displayed on the display and can be, for example, a scanner or the like.

The above embodiment can be combined as desired with one or more of the above modifications. The modifications can also be combined with one another.

According to the present invention, it is possible to properly associate the measurement data of each workpiece with the corresponding work information, regardless of the size, shape, etc., of the workpieces.

Above, while the present invention has been described with reference to the preferred embodiments thereof, it will be understood, by those skilled in the art, that various changes and modifications may be made thereto without departing from the scope of the appended claims.

What is claimed is:

1. A measurement system, comprising:
   a measurement controller connectable to an external network;

a facility controller disconnected from the external network and configured to control operation of production facilities;

a measurement device configured to be controlled by the measurement controller to acquire a measurement data of a current workpiece;

a monitor provided on the facility controller and configured to display a workpiece information corresponding to the current workpiece, the workpiece information sequentially changing in accordance with the current workpiece; and a reader provided to face the monitor and configured to read the workpiece information displayed on the monitor, wherein the measurement controller has a memory configured to store the workpiece information read by the reader and the measurement data of the current workpiece acquired by the measurement device associated with each other.

2. The system according to claim 1, wherein
the current workpiece is produced in accordance with a production plan, wherein
the workpiece information includes an identification information of the current workpiece and the production plan.

3. The system according to claim 2, wherein
the memory has a predetermined capacity, wherein
the measurement controller is configured to estimate an available capacity of the memory based on the production plan read by the reader and a memory usage preset for the measurement date of each workpiece, and configured to output a notification signal when the available capacity estimated becomes a predetermined value or below.

4. The system according to claim 2, wherein
the measurement controller is further configured to control operation of the measurement device based on the production plan read by the reader.

5. The system according to claim 2, wherein
the monitor is configured to display the workpiece information so that a person in charge of a production step of the current workpiece can check the workpiece information.

6. The system according to claim 5, wherein
the reader is a camera arranged so as to photograph an entire display screen of the monitor by preventing the person checking the monitor from entering a photographing range.

* * * * *